(12) United States Patent
Shakimov et al.

(10) Patent No.: US 11,288,249 B2
(45) Date of Patent: Mar. 29, 2022

(54) IMPLEMENTING AN INTERFACE BETWEEN TUPLE AND MESSAGE-DRIVEN CONTROL ENTITIES

(71) Applicant: Nicira, Inc., Palo Alto, CA (US)

(72) Inventors: Amre Shakimov, San Jose, CA (US); Su Wang, Sunnyvale, CA (US); Anupam Chanda, San Jose, CA (US); Pankaj Thakkar, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 16/270,653

(22) Filed: Feb. 8, 2019

(65) Prior Publication Data

US 2019/0188193 A1 Jun. 20, 2019

Related U.S. Application Data

(63) Continuation of application No. 15/045,206, filed on Feb. 16, 2016, now Pat. No. 10,204,122.

(60) Provisional application No. 62/235,532, filed on Sep. 30, 2015.

(51) Int. Cl.
*G06F 16/22* (2019.01)
*G06F 9/54* (2006.01)
*H04L 29/08* (2006.01)
*H04L 67/00* (2022.01)

(52) U.S. Cl.
CPC .......... *G06F 16/2282* (2019.01); *G06F 9/542* (2013.01); *H04L 67/00* (2013.01)

(58) Field of Classification Search
None
See application file for complete search history.

(56) References Cited

U.S. PATENT DOCUMENTS

| 5,426,774 A | 6/1995 | Banerjee et al. |
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 5,805,791 A | 9/1998 | Grossman et al. |

(Continued)

FOREIGN PATENT DOCUMENTS

| CN | 101136866 A | 3/2008 |
| CN | 101437326 A | 5/2009 |

(Continued)

OTHER PUBLICATIONS

Berde, Pankaj, et al., "ONOS Open Network Operating System An Open-Source Distributed SDN OS," Dec. 19, 2013, 34 pages.

(Continued)

*Primary Examiner* — Umut Onat
(74) *Attorney, Agent, or Firm* — Adeli LLP

(57) ABSTRACT

Some embodiments of the invention provide a novel method for interfacing between a first tuple-based controller and a second controller using a message-based protocol. The method of some embodiments identifies a set of changed tuples stored in a set of output tables, generates a set of messages based on the changed tuples, and sends the generated set of messages to a second controller. In some embodiments, the first and second controllers are parts of a network control system that manages forwarding elements to implement a logical network.

20 Claims, 10 Drawing Sheets

(56) References Cited

U.S. PATENT DOCUMENTS

| | | | |
|---|---|---|---|
| 6,055,243 A | 4/2000 | Vincent et al. |
| 6,104,699 A | 8/2000 | Holender et al. |
| 6,219,699 B1 | 4/2001 | McCloghrie et al. |
| 6,366,582 B1 | 4/2002 | Nishikado et al. |
| 6,512,745 B1 | 1/2003 | Abe et al. |
| 6,539,432 B1 | 3/2003 | Taguchi et al. |
| 6,680,934 B1 | 1/2004 | Cain |
| 6,768,740 B1 | 7/2004 | Perlman et al. |
| 6,785,843 B1 | 8/2004 | McRae et al. |
| 6,862,263 B1 | 3/2005 | Simmons |
| 6,941,487 B1 | 9/2005 | Balakrishnan et al. |
| 6,963,585 B1 | 11/2005 | Pennec et al. |
| 6,999,454 B1 | 2/2006 | Crump |
| 7,042,912 B2 | 5/2006 | Smith et al. |
| 7,046,630 B2 | 5/2006 | Abe et al. |
| 7,096,228 B2 | 8/2006 | Theimer et al. |
| 7,120,728 B1 | 10/2006 | Krakirian et al. |
| 7,126,923 B1 | 10/2006 | Yang et al. |
| 7,197,572 B2 | 3/2007 | Matters et al. |
| 7,200,144 B2 | 4/2007 | Ferrell et al. |
| 7,209,439 B2 | 4/2007 | Rawlins et al. |
| 7,263,290 B2 | 8/2007 | Fortin et al. |
| 7,283,473 B2 | 10/2007 | Arndt et al. |
| 7,286,490 B2 | 10/2007 | Saleh et al. |
| 7,342,916 B2 | 3/2008 | Das et al. |
| 7,343,410 B2 | 3/2008 | Mercier et al. |
| 7,359,971 B2 | 4/2008 | Jorgensen |
| 7,450,598 B2 | 11/2008 | Chen et al. |
| 7,460,482 B2 | 12/2008 | Pike |
| 7,478,173 B1 | 1/2009 | Delco |
| 7,483,370 B1 | 1/2009 | Dayal et al. |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,903,666 B1 | 3/2011 | Kumar et al. |
| 7,929,424 B2 | 4/2011 | Kochhar et al. |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,010,696 B2 | 8/2011 | Sankaran et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,060,875 B1 | 11/2011 | Lambeth |
| 8,068,408 B2 | 11/2011 | Ansari et al. |
| 8,089,871 B2 | 1/2012 | Iloglu et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,230,050 B1 | 7/2012 | Brandwine et al. |
| 8,239,572 B1 | 8/2012 | Brandwine et al. |
| 8,265,075 B2 | 9/2012 | Pandey |
| 8,312,129 B1 | 11/2012 | Miller et al. |
| 8,320,388 B2 | 11/2012 | Louati et al. |
| 8,321,561 B2 | 11/2012 | Fujita et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,578,003 B2 | 11/2013 | Brandwine et al. |
| 8,605,734 B2 | 12/2013 | Ichino |
| 8,612,627 B1 | 12/2013 | Brandwine |
| 8,621,058 B2 | 12/2013 | Eswaran et al. |
| 8,644,188 B1 | 2/2014 | Brandwine et al. |
| 8,705,513 B2 | 4/2014 | Merwe et al. |
| 8,717,895 B2 * | 5/2014 | Koponen ............ H04L 41/0853 370/235 |
| 8,750,119 B2 * | 6/2014 | Lambeth ............ H04L 41/0853 370/235 |
| 8,750,288 B2 | 6/2014 | Nakil et al. |
| 8,762,501 B2 | 6/2014 | Kempf et al. |
| 8,958,298 B2 | 2/2015 | Zhang et al. |
| 8,959,215 B2 | 2/2015 | Koponen et al. |
| 9,007,903 B2 | 4/2015 | Koponen et al. |
| 9,124,538 B2 | 4/2015 | Koponen et al. |
| 9,083,609 B2 | 7/2015 | Casado et al. |
| 9,137,102 B1 | 9/2015 | Miller et al. |
| 9,137,107 B2 | 9/2015 | Koponen et al. |
| 9,154,433 B2 | 10/2015 | Koponen et al. |
| 9,172,603 B2 | 10/2015 | Padmanabhan et al. |
| 9,178,833 B2 | 11/2015 | Koponen et al. |
| 9,203,701 B2 | 12/2015 | Koponen et al. |
| 9,252,972 B1 * | 2/2016 | Dukes .................... H04L 45/64 |
| 9,253,109 B2 | 2/2016 | Koponen et al. |
| 9,306,843 B2 | 4/2016 | Koponen et al. |
| 9,319,337 B2 | 4/2016 | Koponen et al. |
| 9,319,338 B2 | 4/2016 | Padmanabhan et al. |
| 9,331,937 B2 | 5/2016 | Koponen et al. |
| 9,354,989 B1 | 5/2016 | Sehgal et al. |
| 9,391,880 B2 | 7/2016 | Koide |
| 9,602,421 B2 | 3/2017 | Koponen et al. |
| 9,722,871 B2 | 8/2017 | Miller et al. |
| 9,838,336 B2 | 12/2017 | Koide |
| 9,843,476 B2 | 12/2017 | Koponen et al. |
| 9,887,960 B2 | 2/2018 | Chanda et al. |
| 9,923,760 B2 | 3/2018 | Shakimov et al. |
| 9,967,134 B2 | 5/2018 | Shakimov et al. |
| 10,033,579 B2 | 7/2018 | Koponen et al. |
| 10,069,646 B2 * | 9/2018 | Shen .................... H04L 12/4633 |
| 10,135,676 B2 | 11/2018 | Koponen et al. |
| 10,204,122 B2 | 2/2019 | Shakimov et al. |
| 10,313,255 B1 | 6/2019 | Matthews et al. |
| 2001/0043614 A1 | 11/2001 | Viswanadham et al. |
| 2001/0044825 A1 | 11/2001 | Barritz |
| 2002/0034189 A1 | 3/2002 | Haddock et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Koshimura et al. |
| 2003/0093481 A1 | 5/2003 | Mitchell et al. |
| 2003/0204768 A1 | 10/2003 | Fee |
| 2003/0233385 A1 | 12/2003 | Srinivasa et al. |
| 2004/0044773 A1 | 3/2004 | Bayus et al. |
| 2004/0047286 A1 | 3/2004 | Larsen et al. |
| 2004/0054680 A1 | 3/2004 | Kelley et al. |
| 2004/0073659 A1 | 4/2004 | Rajsic et al. |
| 2004/0098505 A1 | 5/2004 | Clemmensen |
| 2004/0101274 A1 | 5/2004 | Foisy et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0132044 A1 | 6/2005 | Guingo et al. |

(56) References Cited

U.S. PATENT DOCUMENTS

| | | |
|---|---|---|
| 2005/0147095 A1 | 7/2005 | Guerrero et al. |
| 2005/0220096 A1 | 10/2005 | Friskney et al. |
| 2005/0228952 A1 | 10/2005 | Mayhew et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0028999 A1 | 2/2006 | Iakobashvili et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0182033 A1 | 8/2006 | Chen et al. |
| 2006/0182037 A1 | 8/2006 | Chen et al. |
| 2006/0184937 A1 | 8/2006 | Abels et al. |
| 2006/0193266 A1 | 8/2006 | Siddha et al. |
| 2006/0221961 A1 | 10/2006 | Basso et al. |
| 2006/0248449 A1 | 11/2006 | Williams et al. |
| 2007/0005627 A1 | 1/2007 | Dodge |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0239944 A1 | 10/2007 | Rupanagunta et al. |
| 2007/0239987 A1 | 10/2007 | Hoole et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0034249 A1 | 2/2008 | Husain et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0133687 A1 | 6/2008 | Fok et al. |
| 2008/0159301 A1 | 7/2008 | Heer |
| 2008/0163207 A1 | 7/2008 | Reumann et al. |
| 2008/0165704 A1 | 7/2008 | Marchetti et al. |
| 2008/0189769 A1 | 8/2008 | Casado et al. |
| 2008/0212963 A1 | 9/2008 | Fortin et al. |
| 2008/0225853 A1 | 9/2008 | Melman et al. |
| 2008/0240122 A1 | 10/2008 | Richardson et al. |
| 2008/0291910 A1 | 11/2008 | Tadimeti et al. |
| 2008/0301303 A1 | 12/2008 | Matsuoka |
| 2009/0001845 A1 | 1/2009 | Ikehashi |
| 2009/0031041 A1 | 1/2009 | Clemmensen |
| 2009/0043823 A1 | 2/2009 | Iftode et al. |
| 2009/0070501 A1 | 3/2009 | Kobayashi et al. |
| 2009/0083445 A1 | 3/2009 | Ganga |
| 2009/0113031 A1 | 4/2009 | Ruan et al. |
| 2009/0122710 A1 | 5/2009 | Bar-Tor et al. |
| 2009/0132691 A1 | 5/2009 | Daurensan et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0245793 A1 | 10/2009 | Chiang |
| 2009/0249470 A1 | 10/2009 | Litvin et al. |
| 2009/0249473 A1 | 10/2009 | Cohn |
| 2009/0276661 A1 | 11/2009 | Deguchi et al. |
| 2009/0279536 A1 | 11/2009 | Unbehagen et al. |
| 2009/0279549 A1 | 11/2009 | Ramanathan et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046530 A1 | 2/2010 | Hautakorpi et al. |
| 2010/0046531 A1 | 2/2010 | Louati et al. |
| 2010/0058106 A1 | 3/2010 | Srinivasan et al. |
| 2010/0061231 A1 | 3/2010 | Harmatos et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0153554 A1 | 6/2010 | Anschutz et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0191848 A1 | 7/2010 | Fujita et al. |
| 2010/0205479 A1 | 8/2010 | Akutsu et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0290485 A1 | 11/2010 | Martini et al. |
| 2010/0322255 A1 | 12/2010 | Hao et al. |
| 2011/0016215 A1 | 1/2011 | Wang |
| 2011/0026521 A1 | 2/2011 | Gamage et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0080870 A1 | 4/2011 | Bhalla et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0173490 A1 | 7/2011 | Narayanaswamy et al. |
| 2011/0261825 A1 | 10/2011 | Ichino |
| 2011/0273988 A1 | 11/2011 | Tourrilhes et al. |
| 2011/0296052 A1 | 12/2011 | Guo et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0310899 A1 | 12/2011 | Alkhatib et al. |
| 2011/0317559 A1 | 12/2011 | Kern et al. |
| 2011/0317701 A1 | 12/2011 | Yamato et al. |
| 2012/0014386 A1 | 1/2012 | Xiong et al. |
| 2012/0147894 A1 | 6/2012 | Mulligan et al. |
| 2012/0151550 A1 | 6/2012 | Zhang |
| 2012/0158942 A1 | 6/2012 | Kalusivalingam et al. |
| 2012/0185553 A1 | 7/2012 | Nelson |
| 2012/0195187 A1 | 8/2012 | Ashihara et al. |
| 2012/0236734 A1 | 9/2012 | Sampath et al. |
| 2012/0239790 A1 | 9/2012 | Doane et al. |
| 2013/0024579 A1 | 1/2013 | Zhang et al. |
| 2013/0044636 A1 | 2/2013 | Koponen et al. |
| 2013/0044752 A1 | 2/2013 | Koponen et al. |
| 2013/0054761 A1 | 2/2013 | Kempf et al. |
| 2013/0058339 A1 | 3/2013 | Casado et al. |
| 2013/0058346 A1 | 3/2013 | Sridharan et al. |
| 2013/0060940 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0117428 A1 | 5/2013 | Koponen et al. |
| 2013/0117429 A1 | 5/2013 | Koponen et al. |
| 2013/0125230 A1 | 5/2013 | Koponen et al. |
| 2013/0163427 A1 | 6/2013 | Beliveau et al. |
| 2013/0163475 A1 | 6/2013 | Beliveau et al. |
| 2013/0208623 A1 | 8/2013 | Koponen et al. |
| 2013/0211549 A1 | 8/2013 | Thakkar et al. |
| 2013/0212148 A1 | 8/2013 | Koponen et al. |
| 2013/0212235 A1 | 8/2013 | Fulton et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0219078 A1 | 8/2013 | Padmanabhan et al. |
| 2013/0227097 A1 | 8/2013 | Yasuda et al. |
| 2013/0332602 A1 | 12/2013 | Nakil et al. |
| 2013/0332619 A1 | 12/2013 | Xie et al. |
| 2014/0016501 A1 | 1/2014 | Kamath et al. |
| 2014/0019639 A1 | 1/2014 | Ueno |
| 2014/0040466 A1 | 2/2014 | Yang |
| 2014/0109037 A1 | 4/2014 | Ouali |
| 2014/0115406 A1 | 4/2014 | Agrawal et al. |
| 2014/0115578 A1 | 4/2014 | Cooper et al. |
| 2014/0189212 A1 | 7/2014 | Slaight et al. |
| 2014/0247753 A1 | 9/2014 | Koponen et al. |
| 2014/0348161 A1 | 11/2014 | Koponen et al. |
| 2014/0351432 A1 | 11/2014 | Koponen et al. |
| 2015/0009804 A1 | 1/2015 | Koponen et al. |
| 2015/0052262 A1 | 2/2015 | Chanda et al. |
| 2015/0089032 A1 | 3/2015 | Agarwal et al. |

(56) References Cited

U.S. PATENT DOCUMENTS

| | | |
|---|---|---|
| 2015/0263946 A1 | 9/2015 | Tubaltsev et al. |
| 2015/0263952 A1 | 9/2015 | Ganichev et al. |
| 2015/0304213 A1 | 10/2015 | Ashihara et al. |
| 2015/0341205 A1 | 11/2015 | Invernizzi et al. |
| 2016/0021028 A1 | 1/2016 | Koide |
| 2016/0050117 A1 | 2/2016 | Voellmy et al. |
| 2016/0092259 A1 | 3/2016 | Mehta et al. |
| 2016/0119224 A1 | 4/2016 | Ramachandran et al. |
| 2016/0197774 A1 | 7/2016 | Koponen et al. |
| 2016/0218973 A1 | 7/2016 | Anand |
| 2016/0294604 A1 | 10/2016 | Shakimov et al. |
| 2016/0294680 A1 | 10/2016 | Shakimov et al. |
| 2017/0091004 A1 | 3/2017 | Shakimov et al. |
| 2017/0318113 A1 | 11/2017 | Ganichev et al. |
| 2018/0083829 A1 | 3/2018 | Koponen et al. |

FOREIGN PATENT DOCUMENTS

| | | |
|---|---|---|
| EP | 0737921 A2 | 10/1996 |
| EP | 0887981 A2 | 12/1998 |
| EP | 1443423 A1 | 8/2004 |
| EP | 1653688 A1 | 5/2006 |
| EP | 2838244 A2 | 2/2015 |
| GB | 2485866 A | 5/2012 |
| JP | H07327050 A | 12/1995 |
| JP | H09266493 A | 10/1997 |
| JP | 2003069609 A | 3/2003 |
| JP | 2003124976 A | 4/2003 |
| JP | 2003318949 A | 11/2003 |
| JP | 2006229967 A | 8/2006 |
| JP | 2009159636 A | 7/2009 |
| JP | 2011081588 A | 4/2011 |
| JP | 2011166384 A | 8/2011 |
| JP | 2011166700 A | 8/2011 |
| WO | 2005112390 A1 | 11/2005 |
| WO | 2008095010 A1 | 8/2008 |
| WO | 2009001845 A1 | 12/2008 |
| WO | 2009042919 A2 | 4/2009 |
| WO | 2010103909 A1 | 9/2010 |
| WO | 2011080870 A1 | 7/2011 |
| WO | 2011083780 A1 | 7/2011 |
| WO | 2012093429 A1 | 7/2012 |
| WO | 2013158917 A2 | 10/2013 |
| WO | 2013158918 A1 | 10/2013 |
| WO | 2013158920 A1 | 10/2013 |
| WO | 2013184846 A1 | 12/2013 |
| WO | 2017189061 A1 | 11/2017 |

OTHER PUBLICATIONS

Casado, Martin, et al. "Ethane: Taking Control of the Enterprise," SIGCOMM'07, Aug. 27-31, 2007, 12 pages, ACM, Kyoto, Japan.

Ciavaglia, Laurent, et al., "An Architectural Reference Model for Autonomic Networking, Cognitive Networking and Self-management," Draft ETSI GS AFI 002 V0.0.17, Mar. 2012, 179 pages, http://www.etsi.org.

Enns, R., "NETCONF Configuration Protocol," Dec. 2006, 96 pages, RFC 4741, IETF Trust.

Greenberg, Albert, et al., "A Clean Slate 4D Approach to Network Control and Management," ACM SIGCOMM Computer Communication Review, Oct. 2005, 12 pages, vol. 35, No. 5, ACM, New York, USA.

Greenberg, Albert, et al., "VL2: A Scalable and Flexible Data Center Network," SIGCOMM '09, Aug. 17-21, 2009, 12 pages, ACM, Barcelona, Spain.

Gude, Natasha, et al., "NOX: Towards an Operating System for Networks," ACM SIGCOMM Computer Communication Review, Jul. 2008, 6 pages, vol. 38, No. 3, ACM.

Kent, William, "A Simple Guide to Five Normal Forms in Relational Database Theory," Communications of the ACM, Feb. 1, 1983, 6 pages, vol. 26, No. 2, Association for Computing Machinery, Inc., USA.

Koponen, Teemu, et al., "Onix: A Distributed Control Platform for Large-scale Production Networks," In Proc. OSDI, Oct. 2010, 14 pages.

Krishnaswamy, Umesh, et al., "ONOS Open Network Operating System—An Experimental Open-Source Distributed SDN OS," Apr. 16, 2013, 24 pages.

Reitblatt, Mark, et al., "Consistent Updates for Software-Defined Networks: Change You Can Believe in!" Proceedings of the 10th ACM Workshop on Hot Topics in Networks, Nov. 14-15, 2011, 6 pages, ACM, Cambridge, MA.

Schneider, Fred B., "Implementing Fault-Tolerant Services Using the State Machine Approach: A Tutorial," ACM Computing Surveys, Dec. 1990, 21 pages, vol. 22, No. 4, ACM.

Ferry, Douglas B., "Managing Update Conflicts in Bayou, a Weakly Connected Replicated Storage System," SIGOPS '95, Dec. 1995, 12 pages, ACM, Colorado, USA.

Wang, Wei-Ming, et al., "Analysis and Implementation of an Open Programmable Router Based on Forwarding and Control Element Separation," Journal of Computer Science and Technology, Sep. 2008, 11 pages, vol. 23, No. 5.

* cited by examiner

IMPLEMENTING AN INTERFACE BETWEEN TUPLE AND MESSAGE-DRIVEN CONTROL ENTITIES

CLAIM OF BENEFIT TO PRIOR APPLICATIONS

This application is a continuation application of U.S. patent application Ser. No. 15/045,206, filed Feb. 16, 2016, now issued as U.S. Pat. No. 10,204,122. U.S. patent application Ser. No. 15/045,206 claims the benefit of U.S. Provisional Patent Application 62/235,532, filed Sep. 30, 2015. U.S. patent application Ser. No. 15/045,206, now issued as U.S. Pat. No. 10,204,122, is incorporated herein by reference.

BACKGROUND

There is a growing movement, driven by both industry and academia, towards a new network control paradigm called Software-Defined Networking (SDN). In Software-Defined Networking (SDN), a control plane implements and maintains the control logic that governs the forwarding behavior of shared network switching elements on a per user basis. A logical network that is implemented for a tenant of a hosting system is a good example of an SDN. The virtual (logical) network of a tenant of the hosting system connects a set of data compute nodes (e.g., virtual machines, etc.) that are assigned to the tenant, to each other and to other virtual and/or physical networks through a set of logical switches and logical routers.

In some cases, a network control system manages the control plane using multiple levels of control entities using various systems. Communicating between a tuple-based control entity and a message-driven control entity poses many difficulties as the first relies on eventual consistency to generate output from input data, while the other requires a strict protocol and state machine.

BRIEF SUMMARY

Some embodiments of the invention provide a novel method for interfacing between a first tuple-based controller and a second controller using a message-based protocol. The method of some embodiments identifies a set of changed tuples stored in a set of output tables, generates a set of messages based on the changed tuples, and sends the generated set of messages to a second controller. In some embodiments, the first and second controllers are parts of a network control system that manages forwarding elements to implement a logical network.

In some embodiments, the first controller (or local controller) manages a local control plane for a set of managed forwarding elements, modifying the forwarding behaviors for the set of managed forwarding elements according to logical definitions provided from the logical control plane. The second controller (or central controller) of some embodiments manages the logical control plane, receiving definitions of logical forwarding elements in a logical network and creating logical forwarding data for the first controller to process and implement on the managed forwarding elements of the physical network. The local controllers of some embodiments use a rules engine (e.g., nLog) to translate input data tuples to output data tuples that can be sent to the managed forwarding elements to implement the logical network.

The tuple-based local controller of some embodiments uses cacheable output tables to store processed data tuples. Messages that are generated based on the processed data tuples can be sent to the central controller at various times (e.g., after the tuple-based controller establishes a connection with the central controller(s), upon request from the central controllers, etc.). In some embodiments, the local controller uses both cacheable and non-cacheable output tables to generate messages for the central controller. For example, the local controller of some embodiments uses cacheable output tables to store physical information (e.g., virtual interface (VIF)) information related to the managed forwarding elements, and uses non-cacheable output tables for logical information (e.g., logical addresses for machines operating on the managed forwarding elements) based on data received from the central controller. In some embodiments, the cacheable tables are used for any table that stores computed state data that can be sent to the central controller. In some such embodiments, tables used for inputs or for intermediate processing are not stored in cacheable tables to improve performance of the system.

The local controller of some embodiments uses messages (or data tuples) stored in the output tables to send messages in a particular format or according to a particular protocol (e.g., protobuf) to the central controller. In some embodiments, the local controller establishes dependencies between records in the various output tables to ensure that the generated messages are sent to the central controller in a defined sequence according to the particular protocol. The dependencies between the records of the different tables in some embodiments are dependent on the type of operation that is being performed for the data tuples in the output tables. For example, in some embodiments, while a first record in a first table will depend on a second record in a second table for a first operation, the second record in the second table may depend on the first record for another operation.

The dependencies between the data tuples of the different tables may span over multiple tables and multiple levels. For example, a single data tuple may depend on multiple data tuples in multiple other tables, multiple data tuples from multiple tables may depend on a single data tuple, and a data tuple that depends on another data tuple may in turn have other data tuples that depend on it. The various dependencies are constructed to ensure that the messages based on the output data tuples are sent to the central controller in a specific order. In some embodiments, the dependencies for the data tuples of the output tables are defined based on a virtual network identifier (VNI) associated with a logical network that connects to machines coupled to the managed forwarding elements managed by the local controller.

In some embodiments, the local controller implements the dependence of data tuples in different tables by registering the tables that include the dependent data tuples for notifications regarding the particular data tuples on which the dependent data tuples depend. In some embodiments, the local controller updates the dependent data tuples with references to the particular data tuples when the notification is received. The references in some embodiments are implemented using a counter that indicates the number of remaining dependencies that must be satisfied before a message based on the dependent data tuple can be sent.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
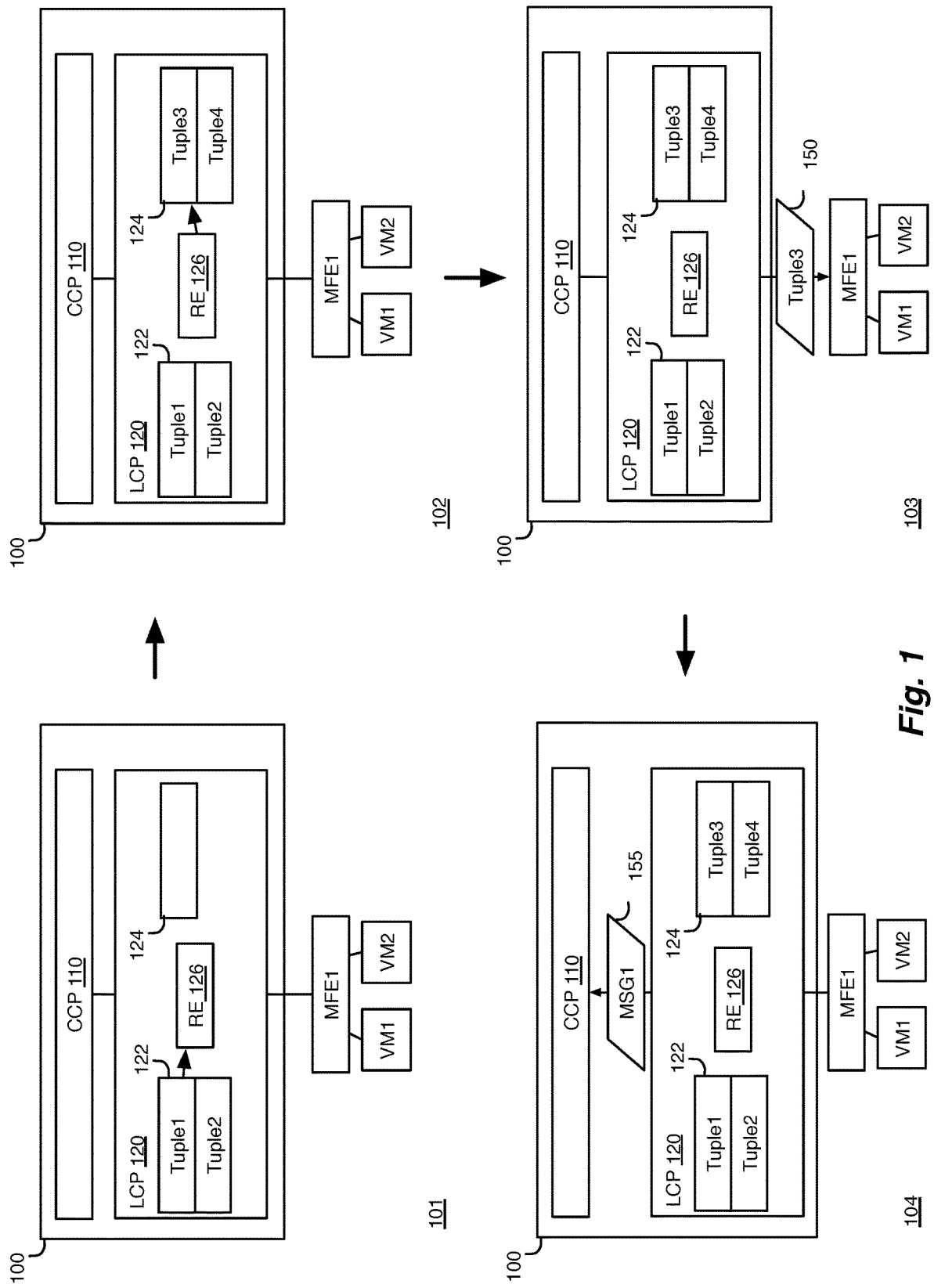
FIG. 1 illustrates an example of a network control system that sends messages based on tuples in a set of output tables.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a novel method for interfacing between a first tuple-based controller and a second controller using a message-based protocol. The method of some embodiments identifies a set of changed tuples stored in a set of output tables, generates a set of messages based on the changed tuples, and sends the generated set of messages to a second controller. In some embodiments, the first and second controllers are parts of a network control system that manages forwarding elements to implement a logical network.

A logical network logically connects a set of end machines (e.g., virtual machines, physical servers, containers, etc.) and a set of physical machines (and other resources of the physical network) using a set of logical forwarding elements (e.g., logical L2 and L3 switches). This allows the physical resources of a physical network to be allocated and shared while maintaining a logical separation between the end machines of the different logical networks.

In some embodiments, the first controller (or local controller) manages a local control plane for a set of managed forwarding elements, modifying the forwarding behaviors for the set of managed forwarding elements according to logical definitions provided from the logical control plane. The second controller (or central controller) of some embodiments manages the logical control plane, receiving definitions of logical forwarding elements in a logical network and creating logical forwarding data for the first controller to process and implement on the managed forwarding elements of the physical network. The controllers of some embodiments use a rules engine (e.g., nLog) to translate input data tuples to output data tuples that can be sent to the managed forwarding elements to implement the logical network.

The tuple-based local controller of some embodiments uses cacheable output tables to store processed data tuples. Messages that are generated based on the processed data tuples can be sent to the central controller at various times (e.g., after the tuple-based controller establishes a connection with the central controller(s), upon request from the central controllers, etc.). The messaging protocol used between the local and central controllers requires a strict adherence to ordering for the messages sent by the local controller. In some embodiments, the messaging protocol allows the central controller to maintain an accurate view of the physical network and to efficiently manage the logical network.

In some embodiments, the local controller uses both cacheable and non-cacheable output tables to generate messages for the central controller. For example, the local controller of some embodiments uses cacheable output tables to store physical information (e.g., virtual interface (VIF)) information related to the managed forwarding elements, and uses non-cacheable output tables for logical information (e.g., logical addresses for machines operating on the managed forwarding elements) based on data received from the central controller. In some embodiments, the cacheable tables are used for any table that stores computed state data that can be sent to the central controller. In some such embodiments, tables used for inputs or for intermediate processing are not stored in cacheable tables to improve performance of the system.

The local controller of some embodiments uses messages (or data tuples) stored in the output tables to send messages in a particular format or according to a particular protocol (e.g., protobuf) to the central controller. In some embodiments, the local controller establishes dependencies between records in the various output tables to ensure that the generated messages are sent to the central controller in a defined sequence according to the particular protocol. The dependencies between the records of the different tables in some embodiments are dependent on the type of operation that is being performed for the data tuples in the output tables. For example, in some embodiments, while a record in a first table will depend on a record in a second table for a first operation, the record in the second table may depend on the first record for another operation.

The dependencies between the data tuples of the different tables may span over multiple tables and multiple levels. For example, a single data tuple may depend on multiple data tuples in multiple other tables, multiple data tuples from multiple tables may depend on a single data tuple, and a data tuple that depends on another data tuple may in turn have other data tuples that depend on it. The various dependencies are constructed to ensure that the messages based on the output data tuples are sent to the central controller in a specific order. In some embodiments, the dependencies for the data tuples of the output tables are defined based on a virtual network identifier (VNI) associated with a logical network that connects to machines coupled to the managed forwarding elements managed by the local controller.

In some embodiments, the local controller implements the dependence of data tuples in different tables by registering the tables that include the dependent data tuples for notifications regarding the particular data tuples on which the dependent data tuples depend. In some embodiments, the local controller updates the dependent data tuples with references to the particular data tuples when the notification is received. The references in some embodiments are implemented using a counter that indicates the number of remaining dependencies that must be satisfied before a message based on the dependent data tuple can be sent.

An overview of the process for implementing an interface between tuple and message-driven controllers is described above. Further details and examples of messaging for tuple-based controllers are described below. Specifically, Section I describes messaging from a tuple-based controller. Section II then describes examples of messaging using cacheable output tables. Section III describes examples of ordered messaging based on output table dependencies. Finally, Section IV describes an electronic system with which some embodiments of the invention are implemented.

I. Messaging for a Tuple-Based Controller

FIG. 1 illustrates an example of a network control system that sends messages based on tuples in a set of output tables in three stages 101-103. This figure shows a network control system 100 that manages a managed forwarding element MFE1 to which two virtual machines VM1-VM2 attach. The network control system 100 includes a central control plane 110 and a local control plane 120, which includes input tables 122, output tables 124, and a rules engine 126.

The network control system 100 of some embodiments is for implementing logical forwarding elements of a set of logical networks on physical elements of a physical network. A logical network logically connects a set of end machines (e.g., virtual machines, physical servers, containers, other resources of the physical network, etc.) using a set of logical forwarding elements (e.g., logical L2 and L3 switches). This allows the physical resources of a physical network to be allocated and shared by multiple different logical networks while maintaining a logical separation between the end machines of the different logical networks.

In some embodiments, the managed forwarding element MFE1 is a software forwarding element (e.g., a virtual switch) that operates on a hypervisor of a host machine along with the virtual machines VM1-VM2. Although only a single software managed forwarding element is shown in this figure, it should be understood that a network control system would manage several forwarding elements, which may include both hardware and software forwarding elements.

The network control system 100 includes a central control plane (CCP) 110, which is implemented by a cluster of central controllers in some embodiments. The central control plane 110 of some embodiments manages and implements logical datapath sets (LDPS) (e.g., logical switches, logical routers, etc.) of the logical networks by communicating with the local control plane (LCP) 120. In some embodiments, the LCP is implemented by a set of controllers that manage the forwarding behaviors of the managed forwarding elements by generating data tuples that are sent to the managed forwarding elements. In some embodiments, the LCP is implemented by local daemons that operate on the host machines along with software managed forwarding elements and virtual machines.

In some embodiments, the LCP uses data tuples to communicate with the managed forwarding elements because data tuples allow for a simple and efficient method for distributing state to the managed forwarding elements. Tuples allow for eventual consistency and do not require frequent and prompt updates. However, CCP does not manage the state using data tuples, but rather a message format that allows CCP to function efficiently, but requires a more strict adherence to ordered messaging. In some embodiments, in order to satisfy both the CCP and the MFEs, the LCP computes data tuples for the managed forwarding elements and translates the tuples into a message format compatible with the CCP.

The first stage 101 shows that the input tables 122 include two tuples Tuple1 and Tuple 2, while the output tables 124 are empty. The first stage 101 also shows that the rules engine 126 processes the tuples of input tables 122. In some embodiments, the rules engine 126 processes the tuples of the input tables 122 using a series of queries and table joins to produce output tables.

In the second stage 102, the rules engine 126 has generated output tuples Tuple 3 and Tuple 4 in the output tables 124. The output tuples of some embodiments include various logical and physical information that can be sent to the CCP 110 and the managed forwarding element MFE1. For example, the output tuples of the output tables 124 may include tuples that define the mappings of logical elements (e.g., logical ports of logical forwarding elements) to physical elements (e.g., physical ports of the MFE1)

The third stage 103 shows that the local controller 120 then sends the data tuple Tuple3 to the managed forwarding element MFE1. In some embodiments, the data tuple Tuple3 defines a forwarding rule and is stored in a set of forwarding tables of MFE1 to process packets for virtual machines VM1 and VM2.

Finally, the fourth stage 104 shows that, in addition to sending the data tuples to MFE1 the local controllers (or LCP 120) sends a message 155 based on the output tuples stored in the output tables 124. In some embodiments, messages from the LCP must be provided to the CCP in a specific format or in a specific order, according to a protocol (e.g., protobuf) specified for communications between the LCP 120 and the CCP 110.

Figure 2:
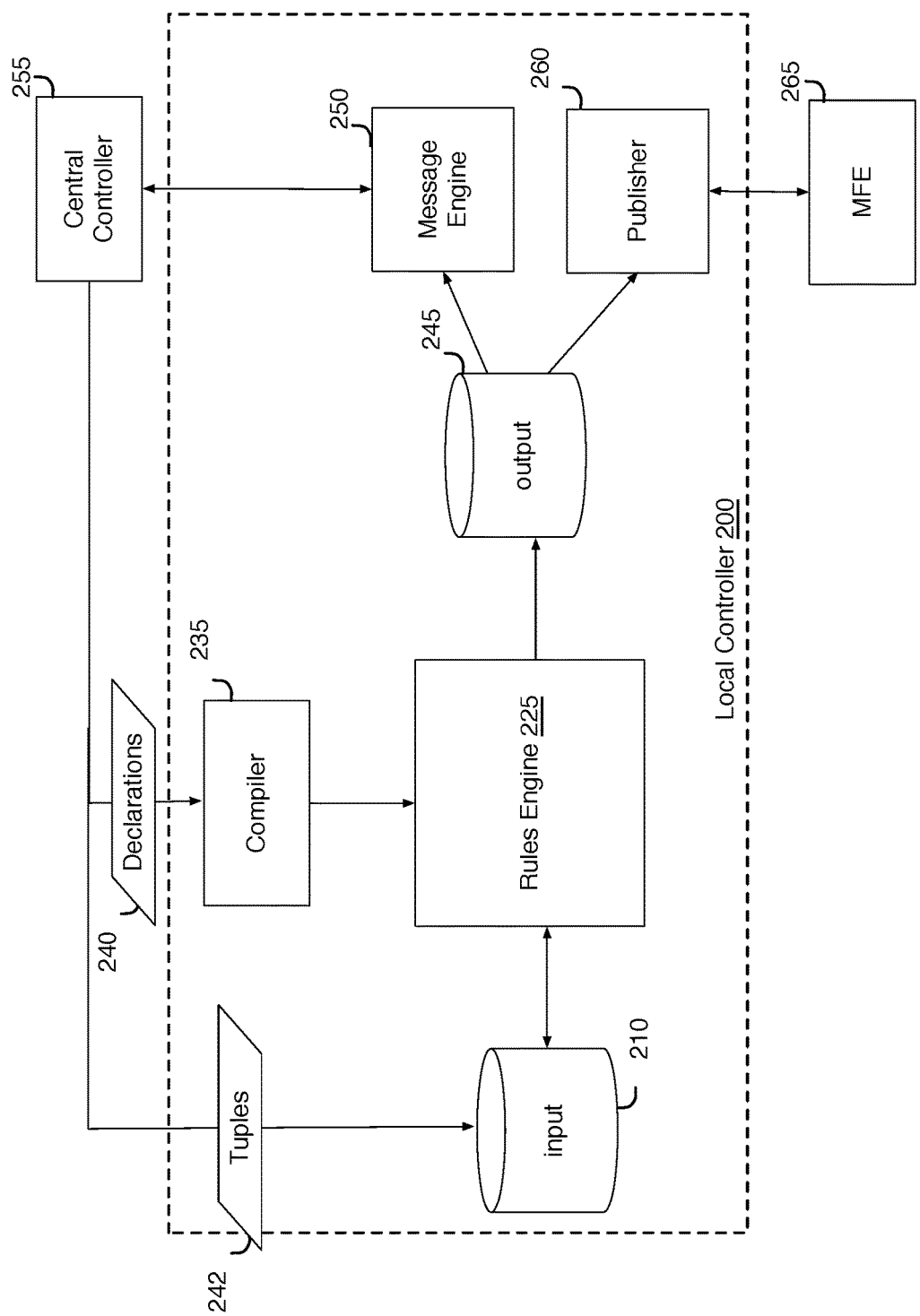
FIG. 2 illustrates an example of a local controller for communicating with a central controller in a network control system in order to manage a managed forwarding element.

FIG. 2 illustrates an example of a local controller that communicates with a central controller in a network control system in order to manage a managed forwarding element. This figure shows a central controller 255 and a managed forwarding element (MFE 265) that communicate with the local controller 200, similar to the example described above with reference to FIG. 1. The local controller 200 includes a set of input tables 210, a rules engine 225, a set of output tables 245, message generator 250, a publisher 260, and a compiler 235. In some embodiments, the local controller 200, managed forwarding element (MFE) 265, and VMs connected to the MFE 265 all operate on a single machine. In some such embodiments, several such machines (i.e., machines with a local controller, MFE, and VMs) are managed by a single instance of the central controller 255.

The central controller 255 is a part of the central control plane (CCP) and converts logical datapath sets (LDPSs) into a set of input data tuples 242 to populate the input tables 210 of the local controller 200. In some embodiments, the input tables 210 include tables with logical data (e.g., access control list configurations, private virtual network configurations, port security configurations, etc.) from the central controller 255 and with physical data (e.g., physical control plane data, virtual interface (VIF) data, etc.) from the MFEs 265 managed by the local controller 200.

The rules engine 225 performs table mapping operations that convert data tuples in the input tables 210 to output data tuples (e.g., messages, forwarding rules, etc.) in the output tables 245. Whenever one of the input tables 210 is modified, the rules engine 225 performs a set of table mapping operations that may result in the modification of one or more data tuples in one or more output tables. The rules engines of different embodiments detect the occurrence of an input table event differently. In some embodiments, the event processor registers for callbacks with the input tables 210 for notification of changes to the data tuples of the input tables 210. In such embodiments, the rules engine 225 performs the table mapping operations to create data tuples in the output tables 245 when it receives notification from the input tables 210 that data tuples have changed.

In some embodiments, the compiler 235 receives declarations 240 of rules and operations (e.g., table dependencies, relationships, references, etc.) to create or implement the rules engine 225. The declarations 240 describe different operations that are to be performed upon the occurrence of different events, which the compiler 235 translates into several sets of database join operations for the table mapping engine (or rules engine). In some embodiments, the declarations 240 are used to configure the rules engine to implement dependencies between data tuples in the various tables in order to enforce a strict ordering for messages that are sent to the central controller. The dependencies are described in further detail below in Section III.

The rules engine 225 maps input tables 210 containing logical datapath set data and switching element attributes to the output tables 245 to generate information regarding the managed switching elements. The generated information is used to send messages to the central controller and flow entries for the managed switching elements.

In some embodiments, the output tables 245 store several different tables for various purposes. The output tables 245 of some embodiments stores data tuples that describe both logical and physical network data. In some embodiments, the data tuples are used to communicate messages with the central controller 255 and to communicate forwarding data to the MFE 265. In some embodiments, the output tables 245 include both cacheable and non-cacheable tables that are used for messaging with the central controller. Cacheable and non-cacheable tables are described in further detail below in Section II.

The publisher 260 of some embodiments then processes the output data tuples in the output tables 245 and propagates the output data tuples to the managed forwarding element(s) 265. The publisher 260 detects changes to the output tables 245 and propagates the modified data tuple(s) to the managed forwarding element 265 to modify forwarding behaviors of the MFE 265.

The message engine 250 processes the output tables 245 to send messages back to the central controller 255 according to a specified communication protocol (e.g., protobuf). In some embodiments, the message engine 250 translates the data tuples of the output tables 245 into the various different formats, while in other embodiments, the rules engine 225 is configured to generate the messages and the message engine 250 is only responsible for sending the generated messages to the central controller 255.

Figure 3:
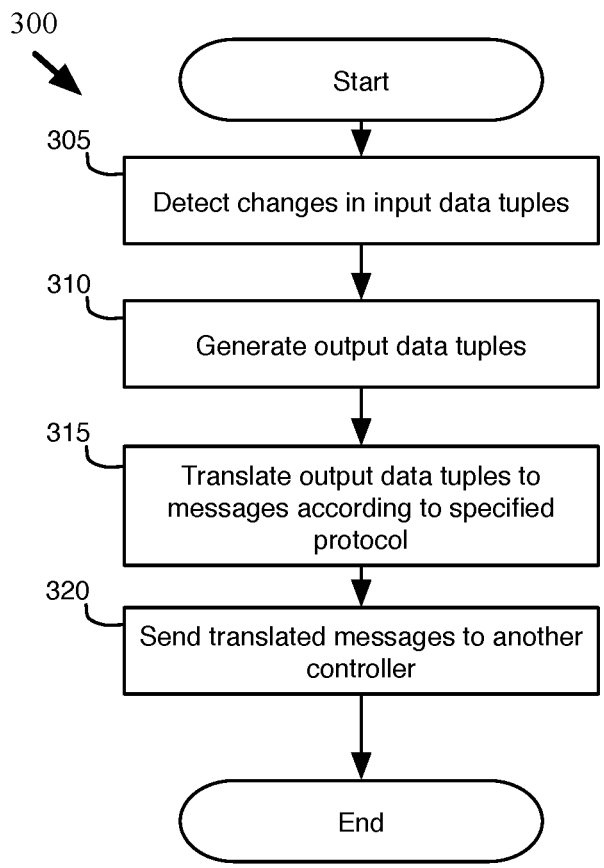
FIG. 3 conceptually illustrates a process for generating and sending messages based on tuples in a set of output tables.

FIG. 3 conceptually illustrates a process for generating and sending messages based on tuples in a set of output tables. The process 300 of some embodiments is performed by a local controller in a network control system. The process 300 begins by detecting (at 305) changes in the input data tuples stored in the input tables. In some embodiments, the process 900 detects changes by registering for notifications from the input data tables.

The process 300 then generates (at 310) corresponding output data tuples based on the changed input data tuples. As described above, the process of some embodiments generates the corresponding output data tuples using a rules engine (or table mapping engine).

The process 300 then translates (at 315) the generated output data tuples to messages according to a specified protocol (e.g., protobuf) for communicating with another controller (e.g., a central controller). Finally, the process 300 sends (at 320) the translated messages to the other controller (e.g., the central controller).

II. Cacheable Output Tables

Figure 4:
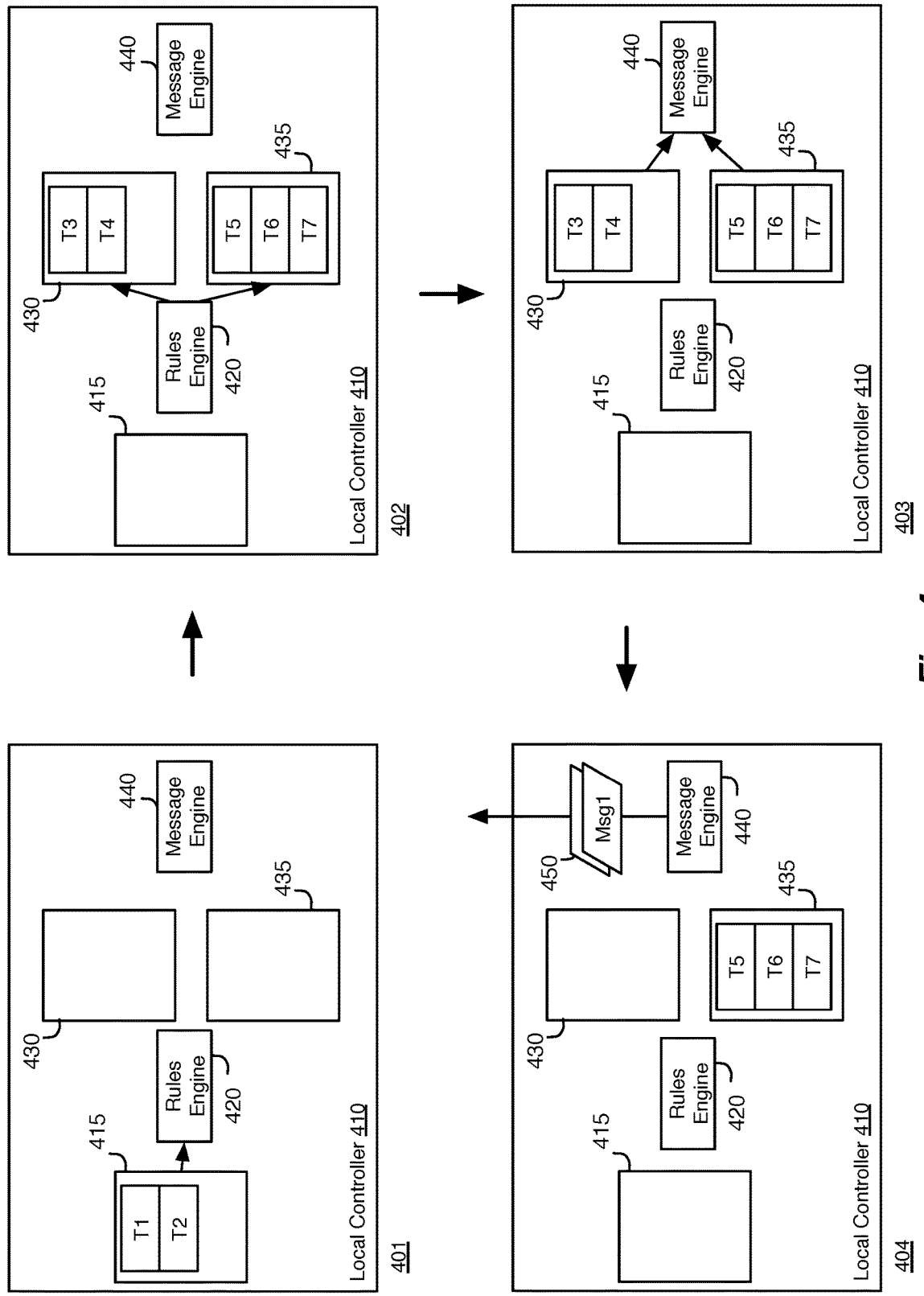
FIG. 4 illustrates an example of sending messages from a tuple-based system using cacheable and non-cacheable output tables.

FIG. 4 illustrates an example of sending messages from a tuple-based system using cacheable and non-cacheable output tables in four stages 401-404. In this example, the local controller 410 generates and sends messages from cacheable tables 435 and non-cacheable output tables 430. The first stage 401 shows a local controller 410, similar to the controllers described above with reference to FIG. 2, with input tables 415, a rules engine 420, output tables 430 and 435, and a message engine 440. In addition, the output tables 430 and 435 include non-cacheable output tables 430 and cacheable output tables 435.

In the first stage 401, the local controller 410 has new input tuples T1 and T2 in the input table 415. The input tuples T1 and T2 may be tuples that are received from the central controller, generated based on communications with managed forwarding elements, generated based on other input tables, etc. The first stage 401 shows that the rules engine 420 detects the changed tuples T1 and T2.

In the second stage 402, the rules engine 420 performs table mapping and join operations generate output tuples T3 and T4 in non-cacheable output table 430 and output tuples T5-T7 in cacheable output table 435. In some embodiments, the rules engine 420 performs a series of operations on several different tables, with outputs of some operations serving as inputs for other operations. In some embodiments, the number of tuples that are generated may differ from the number of input tuples used to generate them.

In some embodiments, the local controller 410 uses both cacheable and non-cacheable output tables to generate messages for the central controller. For example, the local controller 410 of some embodiments uses cacheable output tables 435 to store physical information (e.g., virtual interface (VIF)) information related to the managed forwarding elements, and uses non-cacheable output tables 430 for logical information (e.g., logical addresses for machines operating on the managed forwarding elements) based on data received from the central controller (not shown).

The third stage 403 shows that the message engine 440 monitors both cacheable and non-cacheable output tables 430 and 435 and detects changes in the output tables 430 and 435. The message engine 440 of some embodiments translates the data tuples stored in the output tables 430 and 435 into a message format that is compatible with a specified protocol for communicating with the central controllers.

In some embodiments, the translation of data tuples to messages is not a one-to-one relationship. For example, in some embodiments, the message engine 440 concatenates and combines multiple tuples from the output tables 430 and 435 into a single message. Alternatively, or conjunctively, the message engine 440 of some embodiments translates a single data tuple into multiple messages for the central controller.

In some embodiments, the message engine 440 does not generate the messages at all. Rather, the rules engine 420 performs the table mapping and database join operations in a manner so as to generate and directly store messages for the central controller in the output tables 430.

Finally, the fourth stage 404 shows that the message engine 440 sends the generated messages 450 to the central controller. The generated messages 450 of some embodiments are used to provide physical data (e.g., VIF data) about a managed forwarding element that is managed by the local controller 410. In some embodiments, the protocol for communications between the local controller 410 and the central controller requires a strict ordering of the messages sent by the local controller 410. The use of output table dependencies to enforce the ordering of the messages is described in further detail below in Section III.

The fourth stage 404 also shows that the input tables 415 and the non-cacheable tables 430 are empty because their contents have been processed by the rules engine 420 and forwarded to the central controller by the message engine 440. The cacheable output tables 435, however, still have the tuples T5-T7 that were previously generated by the rules engine 420.

Figure 5:
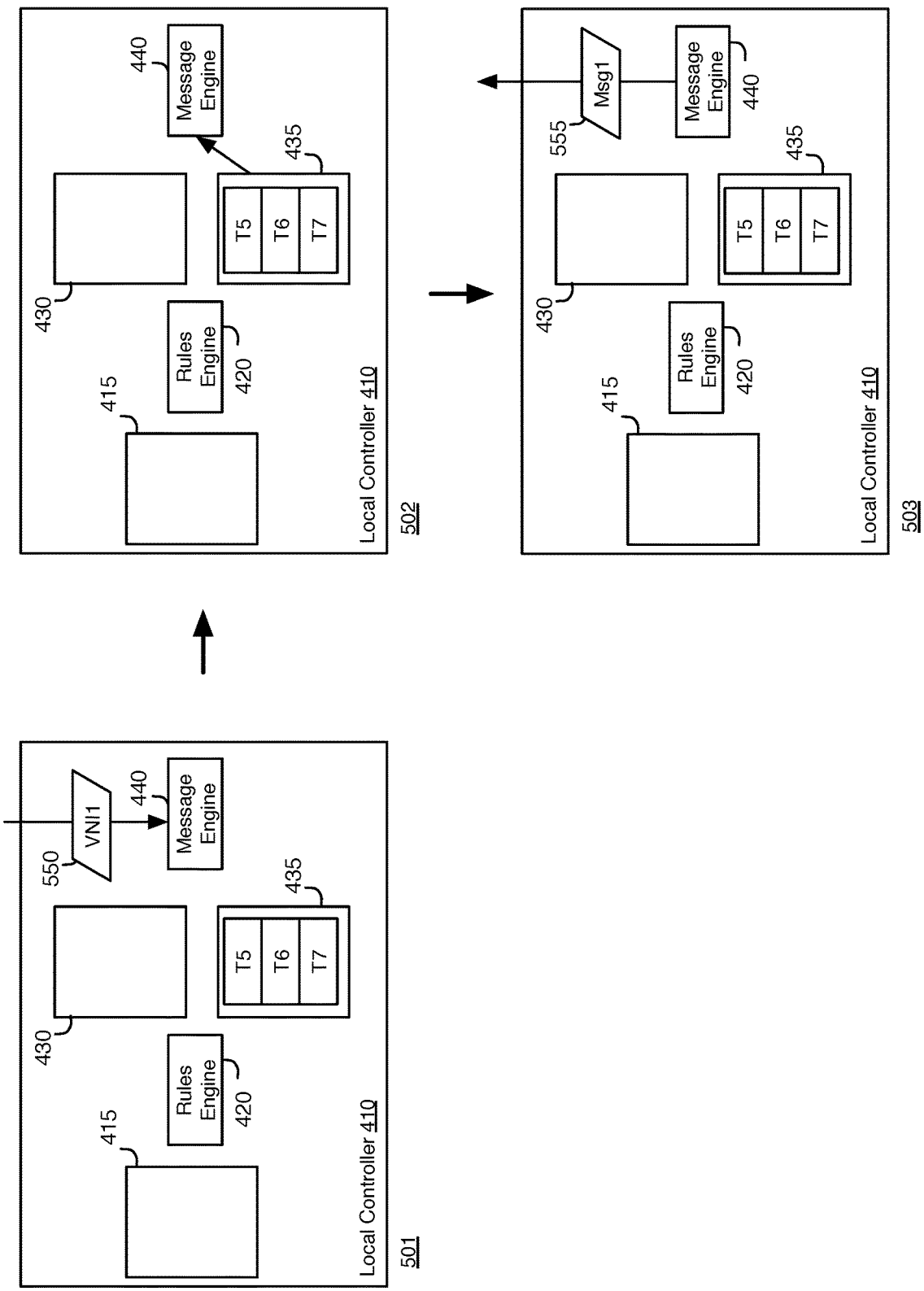
FIG. 5 illustrates another example of sending messages from a tuple-based system using cacheable output tables.

FIG. 5 illustrates another example of sending messages from a tuple-based system using cacheable output tables in three stages 501-503. The first stage 501 shows the local controller 410 as described in FIG. 4. In the first stage 501, the message engine 440 (or other module of the local controller 410) receives a request 550 from the central controller (not shown). The request 550 in this example is a request for all of the information that the local controller 410 has regarding a logical forwarding element, identified by the virtual network identifier (VNI) VNI1.

In some embodiments, the central controller does not send requests for information from the local controllers. Rather the local controllers of some embodiments automatically send messages to the central controllers whenever a connection with a central controller (or multiple central controllers) is established (e.g., an initial connection, after a disconnect, etc.).

In the second stage 502, rather than recalculating the output tuples T5-T7 from input tuples of the input tables 415, the message engine 440 generates new messages from the cached data tuples T5-T7. With the rules engine of some embodiments, it is difficult to recalculate a particular set of output tuples without recreating the exact same input tuples in the input tables 415. Even if the same tuples can be stored in the input tables 415, reprocessing the same data can have unexpected consequences due to the relationships and interconnections of the various input and output tables.

The third stage 503 shows that the message engine 440 sends the recreated message 555 to the central controller. By generating new messages from the cached output tuples of the cacheable output tables 435, some embodiments of the invention avoid having to recalculate output tuples for the outgoing data messages, providing for faster responses and avoiding potential problems in the local controller.

III. Output Table Dependencies

Figure 6:
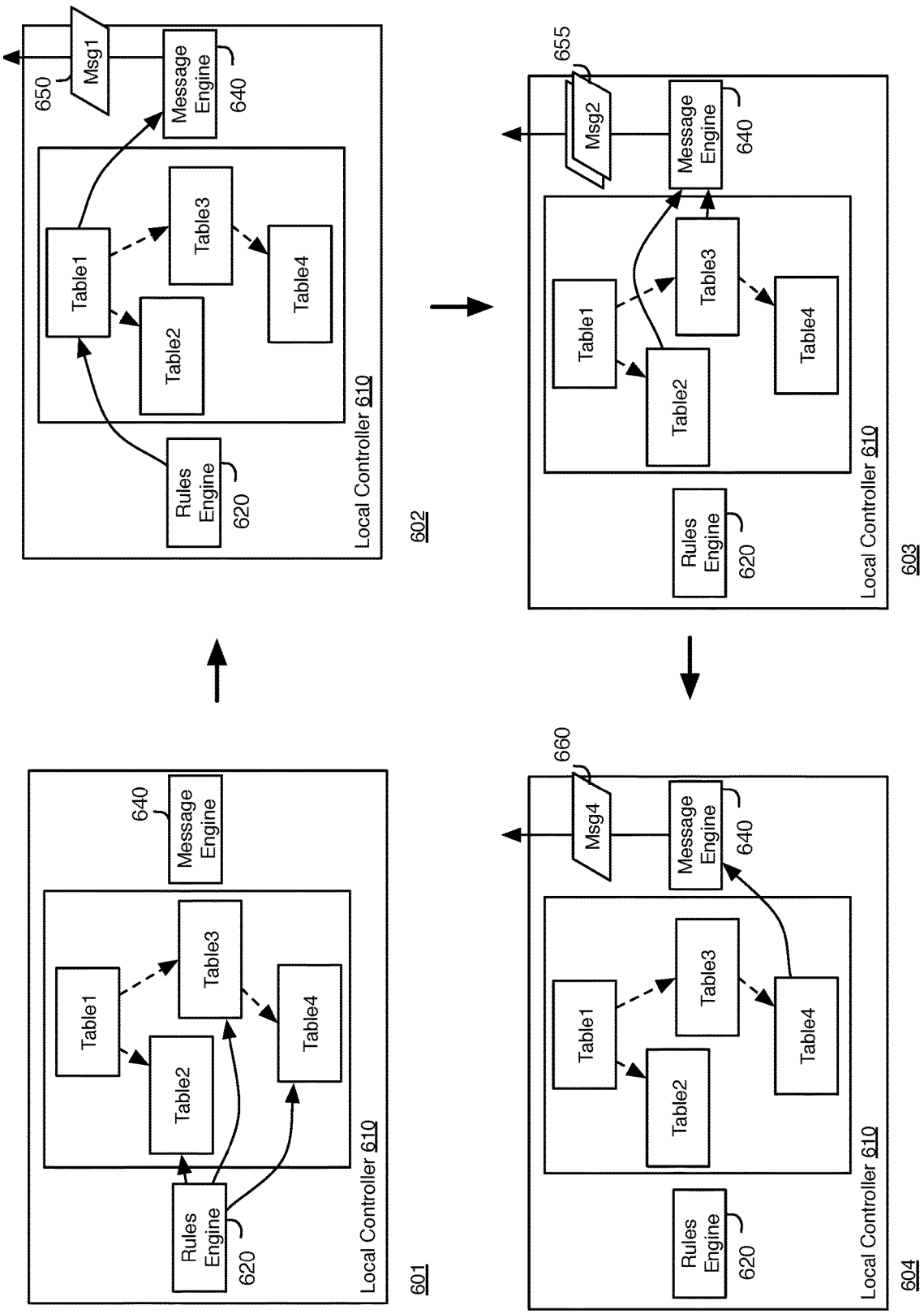
FIG. 6 illustrates an example of creating dependencies between data tuples of a set of output tables.

In some embodiments, in addition to or rather than the cacheable output tables, the local controllers generate and use dependencies between the output tables to enforce a strict ordering of messages communicated to the central controllers. FIG. 6 illustrates an example of creating dependencies between data tuples of a set of output tables in four stages 601-604. In some embodiments, the dependent tables and the table(s) they depend are cacheable tables, non-cacheable tables, or a mix of both.

The first stage 601 shows a local controller 610 with a rules engine 620, output tables (Tables 1-4), and messaging engine 640. The first stage 601 shows that tables 2 and 3 depend on table 1 (as indicated by the dashed lines). In addition, table 4 is dependent on table 3. In this figure, the dependences are shown as dashed arrows between the tables, but in some embodiments, the dependences are between data tuples of the various tables and not between the tables themselves. For example, the dependence of table 2 on table 1, may represent that in order for any tuples from table 2 to be processed by the message engine 640, a particular data tuple must first be detected in table 1. In this way, a data tuple (or multiple data tuples) from each of tables 2 and 3 is dependent on the particular data tuple in table 1. A more detailed example of the dependencies will be described in further detail below with reference to FIGS. 7 and 8.

The first stage 601 also shows that the rules engine 620 generates output data tuples in the output tables 2-4 from data in the input tables (not shown). However, as tables 2 and 3 are dependent on table 1 and table 1 has not yet received the tuple on which the data tuples of 2 and 3 depend, the message engine 640 does not generate or send any messages based on the new output data tuples. Likewise, even though table 4 depends on table 3, the message engine 640 of some embodiments will not process the tuples of table 4 until all the upstream dependencies are satisfied (i.e., until table 1 receives the required tuple).

The second stage 602 shows that the rules engine 620 has now updated table 1 with new output data tuples. In this example, as table 1 is not dependent on any other tables, the message engine 640 processes the new output data tuples of table 1 to generate message 650 and to send it to the central controller.

In the third stage 603, dependencies for the dependent tables 2-4 have been updated with the addition of the new data tuples in table 1. In some embodiments, a first table registers for notifications from a second table when data tuples in the first table are dependent on data tuples in the second table. In such embodiments, tables 2 and 3 would have registered for notification for new tuples at table 1. When the new tuples were received in stage 603, table 1 would have sent notifications to the dependent tables 2 and 3, updating the dependencies, and triggering message engine 640 to send messages 655 based on the tuples stored in tables 2 and 3.

Similarly, with the processing of the tuples of table 3, the fourth stage 604 shows that the dependency of table 4 is satisfied, triggering the message engine 640 to send a message 660 based on the tuples of table 4 to the central controller. By configuring the tuples of table 4 to depend on the tuples of table 3, and the tuples of tables 2 and 3 to depend on the tuples of table 1, the local controller 610 ensures that messages based on the tuples of table 1 are sent before the tuples of tables 2 and 3, and that messages based on the tuples of table 3 are sent before messages based on the tuples of table 4.

Figure 7:
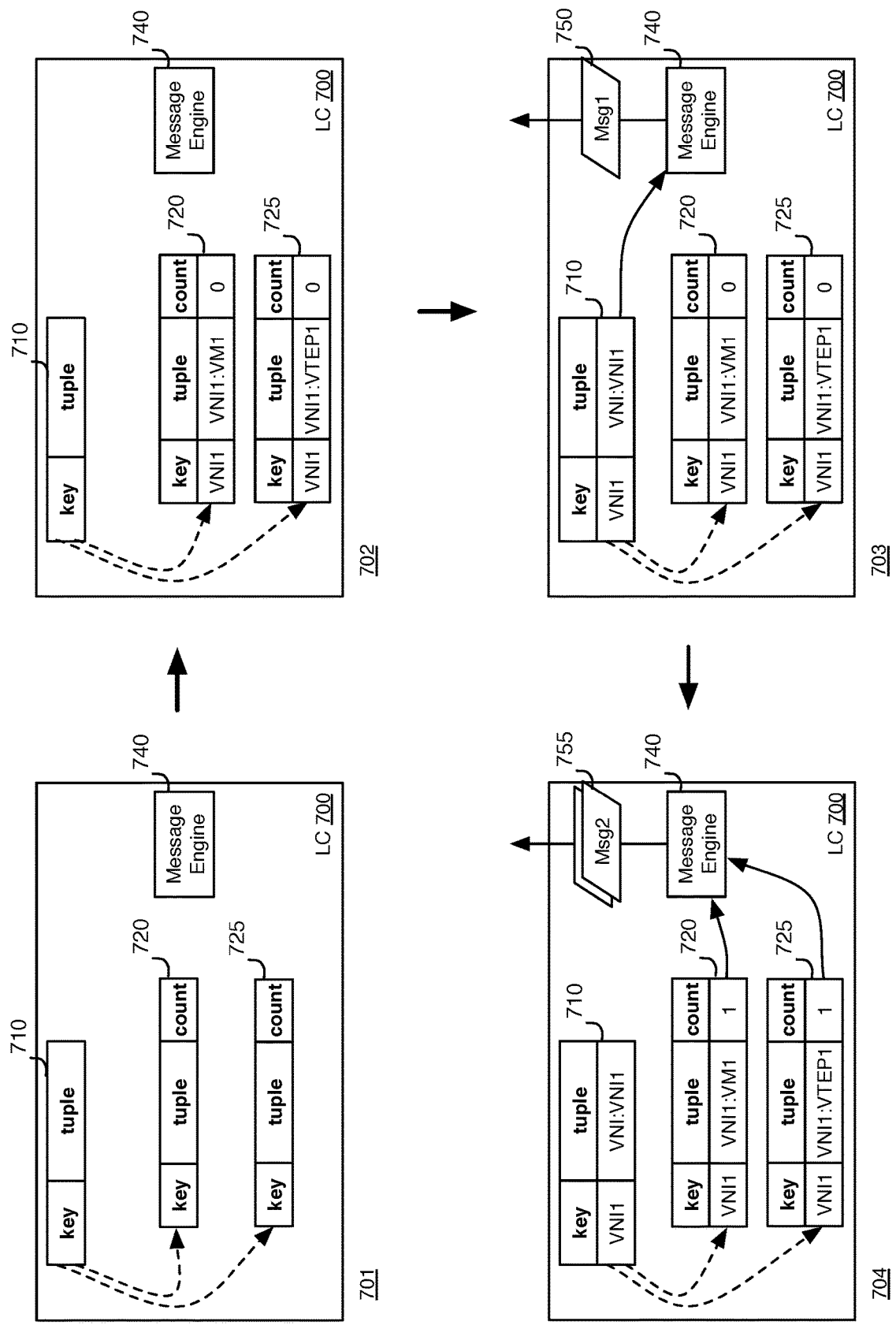
FIG. 7 illustrates an example of sending messages for inserted tuples in a set of dependent output tables.

FIG. 7 illustrates an example of sending messages for inserted tuples in a set of dependent output tables in four stages 701-704. In this example, local controller 700 needs to join a VNI (i.e., inform the central controller that the local controller manages at least one VM or port of the VNI) and to send information about the VNI (e.g., VM information) to the central controller.

The first stage 701 shows a local controller 700 with a message engine 740. The local controller 700 also shows three tables 710, 720, and 725. In this example, tables 720 and 725 are dependent on table 710. The output tables 710, 720, and 725 are currently empty, but are for storing output data tuples generated by the rules engine (not shown). In addition, each of the dependent tables 720 and 725 maintains a reference and a counter to indicate the dependence of the data tuples in tables 720 and 725 on data tuples in the table 710.

In the second stage 702, dependent output tables 720 and 725 have been updated with output data tuples. Dependent output table 720 is for storing virtual machine (VM) information and shows a data tuple "VNI1:VM1" which indicates that VM1, attached to a managed forwarding element of local controller 700, is a part of VNI1. Dependent output table 725 stores virtual tunnel end point (VTEP) information and shows a data tuple "VNI1:VTEP1" which indicates that the address for the VTEP for VNI1 is VTEP1. However, the count (or reference) for both of these data tuples is 0, indicating that the data tuple on which they depend has not yet been received.

Table 710 stores VNI information, and based on the VNI information, the message engine 740 generates messages to join the different VNIs (i.e., to inform the central controller that the local controller manages at least one VM or port of the VNI). In this case, table 710 does not yet have any VNI information. In this example, the tuples in tables 720 and 725 are made dependent on the data tuple of table 710, because the protocol rejects or ignores messages regarding a particular VNI (VNI1), when the local controller 700 has not joined the VNI. If message engine 740 sent messages from output tables 720 and 725 without regard to the dependencies, the messages regarding VNI1 would be ignored and could not readily be re-sent.

The third stage 703 shows that output table 710 has received a data tuple ("VNI:VNI1") indicating that the local controller (or machines attached to the managed forwarding element of the local controller) are to join VNI1. As output table 710 has no further dependencies, the message engine 710 generates a message 750 to join VNI1 and sends it to the central controller.

Finally, in the fourth stage 704, the references (or counts) for dependent tables 720 and 725 have been updated to 1, indicating the receipt of the data tuple in table 710. The message engine 740 processes the tuples of tables 720 and 725 to send messages 755 with information for VM1 and VTEP1 of VNI1 to the central controller. The necessary number of dependencies (in this case 1), can be any number of dependencies in some embodiments. As shown in this example, multiple records in multiple tables may depend on a single record. In other cases, a single data tuple may depend on multiple data tuples from one or more other tables.

Figure 8:
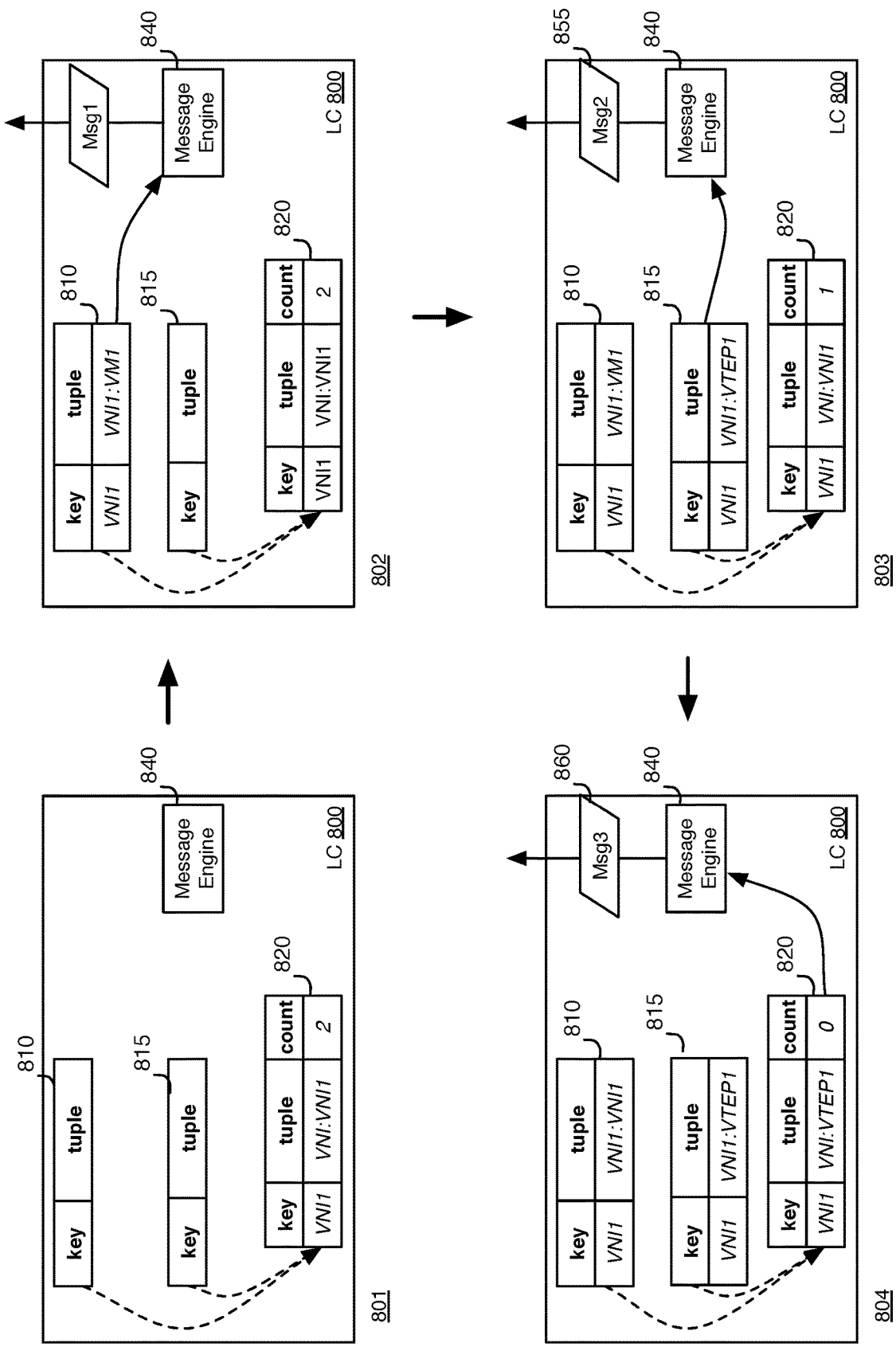
FIG. 8 illustrates an example of sending messages for deleted tuples of a set of dependent output tables.

The example of FIG. 7 showed an insert operation for joining and providing data regarding a VNI. In some embodiments, the dependencies of the various tables will change based on the type of operation that is being performed on the data tuples. FIG. 8 illustrates an example of sending messages for deleted tuples of a set of dependent output tables in four stages 801-804. The example of this figure is similar to the example of FIG. 7, but rather than inserting tuples to join a VNI and to send data regarding that VNI, in this example, removes tuples to leave the VNI and remove the data regarding that VNI.

The first stage 801 shows local controller 800 with a message engine 840. The local controller 800 also shows three tables 810, 815, and 820. In this example, table 820 is dependent on tables 810 and 815. The output tables 810 and 815 are currently empty, but dependent output table 820 shows an output data tuple ("VNI:VNI1").

In this example, the output data tuple is a delete tuple (shown in italics) that indicates that the tuple is to be deleted (i.e., the local controller 800 wants to leave VNI1). In some embodiments, each data tuple includes a flag (e.g., 'delete=true') that indicates whether the tuple is for insertion or deletion. Dependent table 820 also maintains a counter to indicate the dependence of the data tuple on delete data tuples in tables 810 and 815. In this case, the count begins at 2 based on the two records that were inserted for the VNI1 in the example of FIG. 7. As shown in this example, a data tuple that is depended upon by a second data tuple for a first operation (e.g., insert), may depend on the second data tuple for a second operation (e.g., delete).

In the second stage 802, output data table 810 has received a delete data tuple for removing the VM information. As table 810 does not depend on any other tables, the message engine 840 sends message 850 to the central controller based on the updated data tuple.

After message engine 840 sends message 850, the third stage 803 shows that the count for output data table 820 has been updated to 1, indicating that only one dependency is remaining. The third stage 803 also shows that output table 815 has received a delete data tuple for removing the VTEP information and sent a corresponding message 855 to the central controller.

Finally, in the fourth stage 804, the count for table 820 has been updated to 0, indicating that no more dependencies remain for the data tuple, allowing message engine 840 to send a message 860 to remove the local controller 800 from the VNI1. The use of the various dependencies and sub-dependencies (i.e., dependencies on other dependent tuples) allows for a flexible and general mechanism for enforcing a strict order for messages based on tuples generated at a controller.

Figure 9:
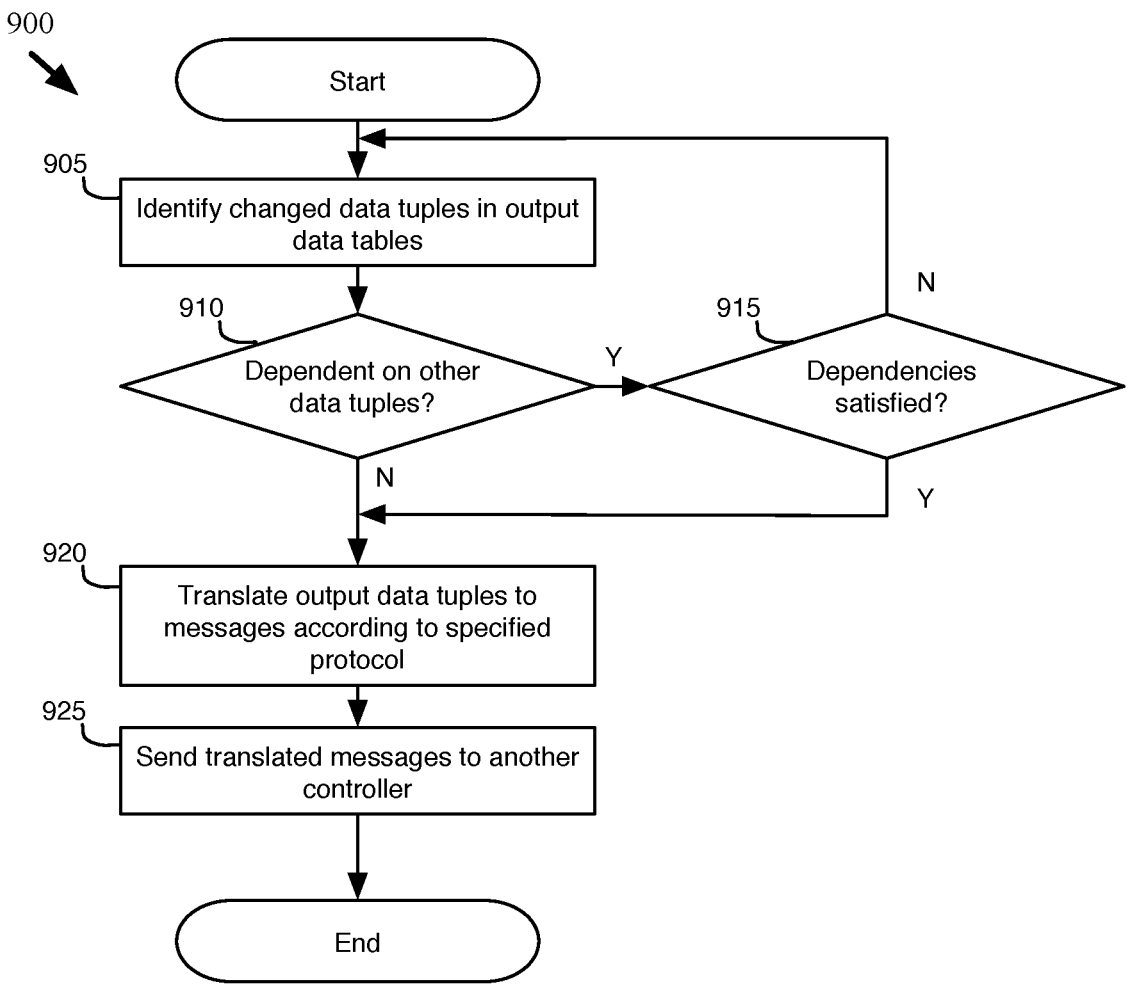
FIG. 9 conceptually illustrates a process for using dependencies to generate and send messages based on tuples in a set of output tables.

FIG. 9 conceptually illustrates a process for using dependencies to generate and send messages based on tuples in a set of output tables. The process 900 of some embodiments is performed by a local controller in a network control system. The process 900 begins by identifying (at 905) changed data tuples in a set of output data tables. The process 900 then determines (at 910) whether the changed data tuples are dependent on other data tuples. When the process 900 determines (at 910) that the changed data tuples are not dependent on any other data tuples, the process continues to step 920 described below.

When the process 900 determines (at 910) that the changed data tuples are dependent on other data tuples, the process determines (at 915) whether the dependencies have been satisfied. As described above, the process 900 of some embodiments determines (at 915) whether dependencies have been satisfied based on counters or references that indicate the dependent relationships between the various data tuples. For example, in some embodiments, the process 900 determines whether the value for a counter of a particular tuple matches a particular value (e.g., 0 when performing a deletion operation, some number greater than 0 when performing an insert operation). When the process 900 determines (at 915) that the dependencies have not been satisfied, the process returns to step 905.

When the process 900 determines (at 915) that the dependencies have been satisfied, the process translates (at 920) the generated output data tuples to messages according to a specified protocol for communicating with another controller (e.g., a central controller). Finally, the process 900 sends (at 925) the translated messages to the other controller.

IV. System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
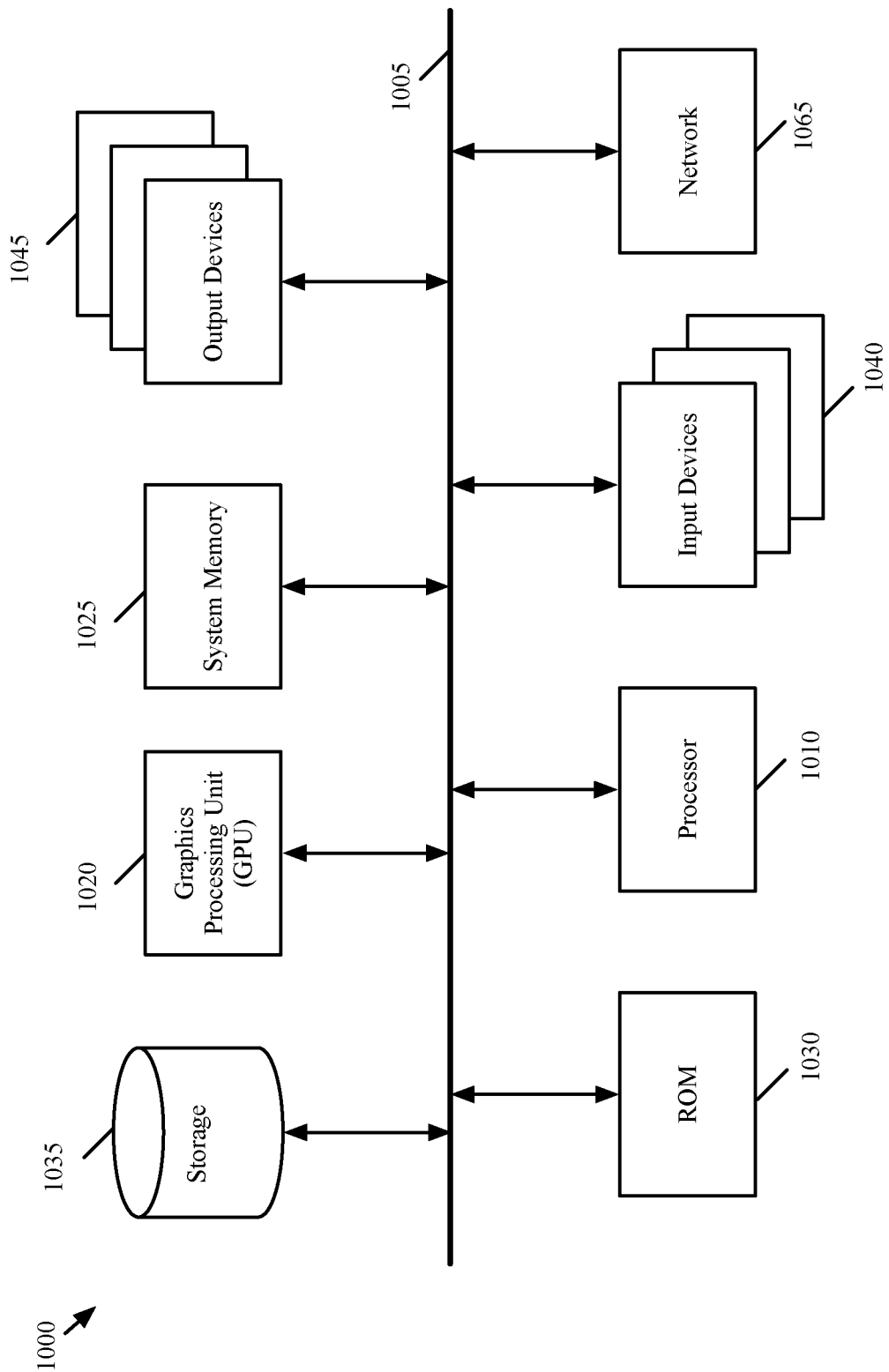
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding drive) as the permanent storage device. Like the permanent storage device 1035, the system memory 1025 is a read-and-write memory device. However, unlike storage device 1035, the system memory 1025 is a volatile read-and-write memory, such a random access memory. The system memory 1025 stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory machine readable medium storing a local controller executing on a set of processing units of a first host computer and interfacing between a central controller and at least a first managed forwarding element (MFE) that also executes on the first host computer, the local controller comprising a set of tables and sets of instructions for:

based on a determination that a first set of data tuples stored in the set of tables has been modified, generating a second set of data tuples for providing to the first MFE in order to configure the first MFE to implement a logical forwarding element (LFE);

translating the generated second set of data tuples into a set of control messages (i) that relate to the generated second set of data tuples and (ii) that are compatible with a message-based protocol specified for communicating with the central controller; and sending the set of control messages to the central controller for the central controller to forward data to other local controllers on other host computers based on the set of control messages in order for the other local controllers on the other host computers to generate configuration data for configuring other MFEs executing on the other host computers to implement the LFE.

2. The non-transitory machine readable medium of claim 1, wherein the local controller further comprises a set of instructions for determining that the first set of data tuples has been modified by monitoring the set of tables.

3. The non-transitory machine readable medium of claim 1, wherein the message-based protocol is the protobuf protocol.

4. The non-transitory machine readable medium of claim 1, wherein the set of instructions for translating the generated second set of data tuples into the set of control messages comprises a set of instructions for generating a first number of control messages based on a second number of data tuples, wherein the first number and the second number are different.

5. The non-transitory machine readable medium of claim 1, wherein the set of tables comprises a set of input tables and a set of output tables, wherein the set of instructions for generating the second set of data tuples comprises a set of instructions for generating a first subset of the second set of data tuples in a set of cacheable output tables and a second subset of the second set of data tuples in a set of non-cacheable output tables.

6. The non-transitory machine readable medium of claim 5, wherein the set of instructions for generating the first and second subsets of the second set of data tuples comprises a set of instructions for performing a series of table joins on the set of input tables to create records in the sets of cacheable and non-cacheable output tables.

7. The non-transitory machine readable medium of claim 5, wherein the local controller further comprises a set of instructions for, upon determining that a connection with the central controller has been re-established, sending the set of control messages to the central controller based on the data tuples stored in the subset of cacheable output tables.

8. The non-transitory machine readable medium of claim 5, wherein the set of instructions for sending the set of control messages comprises sets of instructions for:
sending a first subset of control messages based on the first subset of data tuples and a second subset of control messages based on the second subset of data tuples; and
removing only the second subset of data tuples from the set of non-cacheable output tables.

9. The non-transitory machine readable medium of claim 5, wherein the set of cacheable output tables is for storing physical information identified by the local controller, wherein the physical information comprises virtual interface (VIF) information for the first MFE.

10. The non-transitory machine readable medium of claim 9, wherein the set of non-cacheable output tables is for storing logical information regarding the first MFE, wherein the logical information comprises mappings of the VIF information to elements of a logical network that includes the LFE.

11. The non-transitory machine readable medium of claim 10, wherein the logical information further comprises at least one of a virtual machine (VM) Internet Protocol (IP) address, a VM Media Access Control (MAC) address, and a virtual tunnel end point (VTEP) IP address.

12. The non-transitory machine readable medium of claim 5, wherein the set of instructions for sending the set of control messages comprises a set of instructions for (i) receiving a request for information regarding the LFE from the central controller and (ii) sending the set of control messages comprising the requested information in response to the request, wherein a key is used to filter the requested information, wherein the key is a virtual network identifier (VNI) for a logical network associated with the LFE and at least one machine attached to the first MFE managed by the local controller.

13. The non-transitory machine readable medium of claim 1, wherein the set of instructions for the second set of data tuples comprises sets of instructions for (i) processing the modified first set of data tuples and (ii) identifying a dependence of a first subset of dependent data tuples stored in a first table on a second subset of data tuples stored in a second table.

14. The non-transitory machine readable medium of claim 13, wherein the dependence is based on a key stored in the first and second tables, wherein the key is a virtual network identifier (VNI) for a logical network associated with the LFE and at least one machine attached to the first MFE managed by the local controller.

15. The non-transitory machine readable medium of claim 13, wherein the set of instructions for processing the modified first set of data tuples further comprises a set of instructions for identifying a dependence of a third subset of dependent data tuples stored in a third table on the second subset of data tuples.

16. The non-transitory machine readable medium of claim 13, wherein the set of instructions for processing the modified first set of data tuples further comprises a set of instructions for identifying a dependence of a third subset of dependent data tuples stored in a third table on the first subset of dependent data tuples.

17. The non-transitory machine readable medium of claim 13, wherein the modified first set of data tuples indicate a particular type of operation, wherein the set of instructions for processing the modified first set of data tuples comprises sets of instructions for (i) identifying the dependence of a third subset of data tuples stored in a third table on a fourth subset of data tuples stored in a fourth table when the particular type of operation is a first type of operation, and (ii) identifying a dependence of the fourth subset of data tuples on the third subset of data tuples when the particular type of operation is a second type of operation.

18. The non-transitory machine readable medium of claim 17, wherein the modified first set of data tuples comprise a flag to indicate whether the operation is an insert operation or a delete operation.

19. The non-transitory machine readable medium of claim 13, wherein the first table is registered for notifications for changes to the second subset of data tuples stored in the second table, wherein the set of instructions for generating the second set of data tuples further comprises a set of instructions for updating, when the first table receives a notification regarding changes to the second subset of data tuples, a reference in the first subset of dependent data tuples, wherein the reference indicates whether messages translated from the first subset of dependent data tuples can be sent.

20. The non-transitory machine readable medium of claim 19, wherein the reference is a counter, wherein the set of instructions for sending the set of control messages comprises a set of instructions for determining whether the counter has a particular value.

* * * * *